J. WETMORE.
Nut-Locking Devices.
No. 135,052.  Patented Jan. 21, 1873.
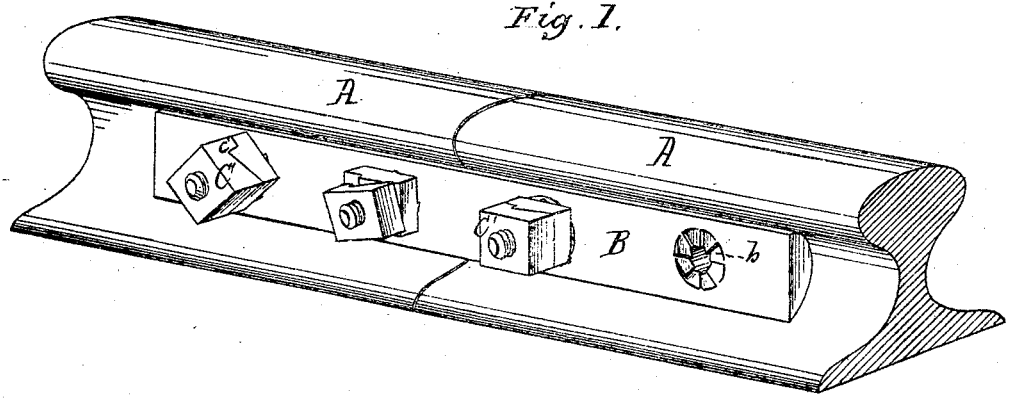
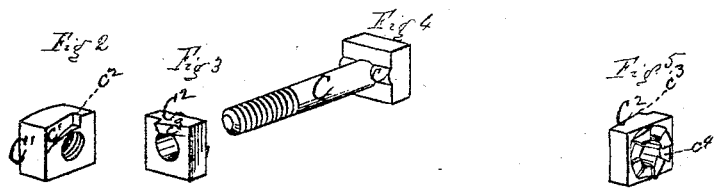
Witnesses  
Alex Mahon  
N B Smith
Inventor  
John Wetmore  
by A. M. Smith  
Attorney

UNITED STATES PATENT OFFICE.

JOHN WETMORE, OF SALEM, OHIO.

IMPROVEMENT IN NUT-LOCKING DEVICES.

Specification forming part of Letters Patent No. 135,052, dated January 21, 1873.

*To all whom it may concern:*

Be it known that I, JOHN WETMORE, of Salem, county of Columbiana, State of Ohio, have invented certain new and useful Improvements in Railroad Splice-Joints, of which the following is a full, clear, and exact description, reference being had to the accompanying drawing making part of this specification, in which—

Figure 1 is a perspective view of my improved joint, showing the nut in two positions. Figs. 2, 3, 4, and 5 are detached views of the bolt, nut, and washer.

In the practical experience of all railroad managers there has long been a want experienced of a locking-nut adapted for use upon fish-plates and similar splicing-bars without the employment of supplemental clasping-straps, which require to be straightened out to permit the nut to be screwed up, and then bent around the nut to prevent it from backing off, experience having proven that the removable locking-plates are too liable to displacement. A number of locking-nuts have been invented having serrated, milled, ratcheted, or corrugated faces adapted to engage with corresponding projections or indentations upon the splice-bars, but depending upon the elasticity of the parts for permitting the teeth or rails of the nut to pass those on the splice-bar or a washer used in connection therewith, this construction being objectionable because it is impossible to bring the parts to a firm and positive bearing.

With a view to obviate the above-indicated objections and to produce a splice-joint for railroad rails in which the nuts and bolts can be brought up to a rigid union of metal to metal, I have made this invention, which consists in combining with a fish-plate or other suitable splice-bar having a ratchet-seat or circular space around the bolt-holes a nut and a washer of a peculiar construction, as will be hereinafter fully described.

In the drawing, A A represent the two rails. B is a fish-plate or splice-bar of any usual or desired construction, except that the nut-seat $b$ stamped or cut around the bolt-hole is milled, ratcheted, or corrugated. C is the bolt, the head of which is provided with a rib, $c$, adapted to fit into a rib formed in the splice-bar upon the opposite side of the rail, it being, of course, understood that a bar is used upon each side of the rails, although but one is shown in the drawing. $C^1$ is the nut. It is made in the usual shape, except that it has an angular recess, $c^1 c^2$, in its inner face. The washer $C^2$ is provided upon its under side with radial teeth $c^4$, which correspond substantially with the serrations in the seat $b$. The upper side of the washer—that is, the side which engages with the nut—is provided with a beveled projection or spur, $c^3$, which fits accurately the recess $c^1 c^2$, as shown in the two end-nuts, Fig. 1.

In applying my splice-bar I screw the nut and washer up as tightly as possible, keeping the nut and washer in the position shown by the end nuts in Fig. 1; and when the ratcheted face of the washer is brought into close contact with the splice-bar I turn the nut backward a little, as shown by the middle nut in Fig. 1. This movement locks it (the nut) securely, as the washer cannot turn backward on account of its ratcheted face, and the nut cannot back off from the washer on account of the inclined engaging faces of the recess $c^1 c^2$ and the projection $c^3$.

I do not claim to have invented any part of the bolt C, nut $C^1$, or washer $C^2$, as they are fully shown and described in patent of H. C. Stouffer, January 9, 1872, but I believe the combination shown by me to be a valuable improvement upon his, as follows: It is fully understood by those who are practically familiar with the operation of bolts as applied to fish-plates that no compound nut or nut and washer can be made to engage with the flat surface of a fish-plate in such manner as to prevent backward rotation, because, in the first place, even though they be screwed up tightly when the rails are laid the swaging and fitting together of parts will soon produce a slight loosening sufficient to permit the ratchet-teeth to move backward over any slight lip or shoulder that might be raised by the teeth, whereas, with my construction, any desired depth of serration may be formed in the seat $b$; and after the teeth on washer $C^2$ are firmly seated the parts are locked by turning said nut backward, thus making the entire depth of the teeth available; and, secondly, it is, in practice, difficult to make the teeth hard enough to take hold of the fish-plate at all without making them so brittle that they will not bear the strain imposed upon them.

Having now described my invention, what I claim as new, and desire to secure by Letters Patent, is—

In combination with the bolt C, nut $C^1$ having the recess $c^1$ $c^2$, and the washer $C^2$ having the ratcheted face and spur $c^3$, the fish-plate or splice-bar B provided with the ratcheted or milled nut-seat $b$, substantially as described.

JOHN WETMORE.

Witnesses:
W. H. A. THOMPSON,
R. H. GARRIGUES.